Patented May 19, 1931

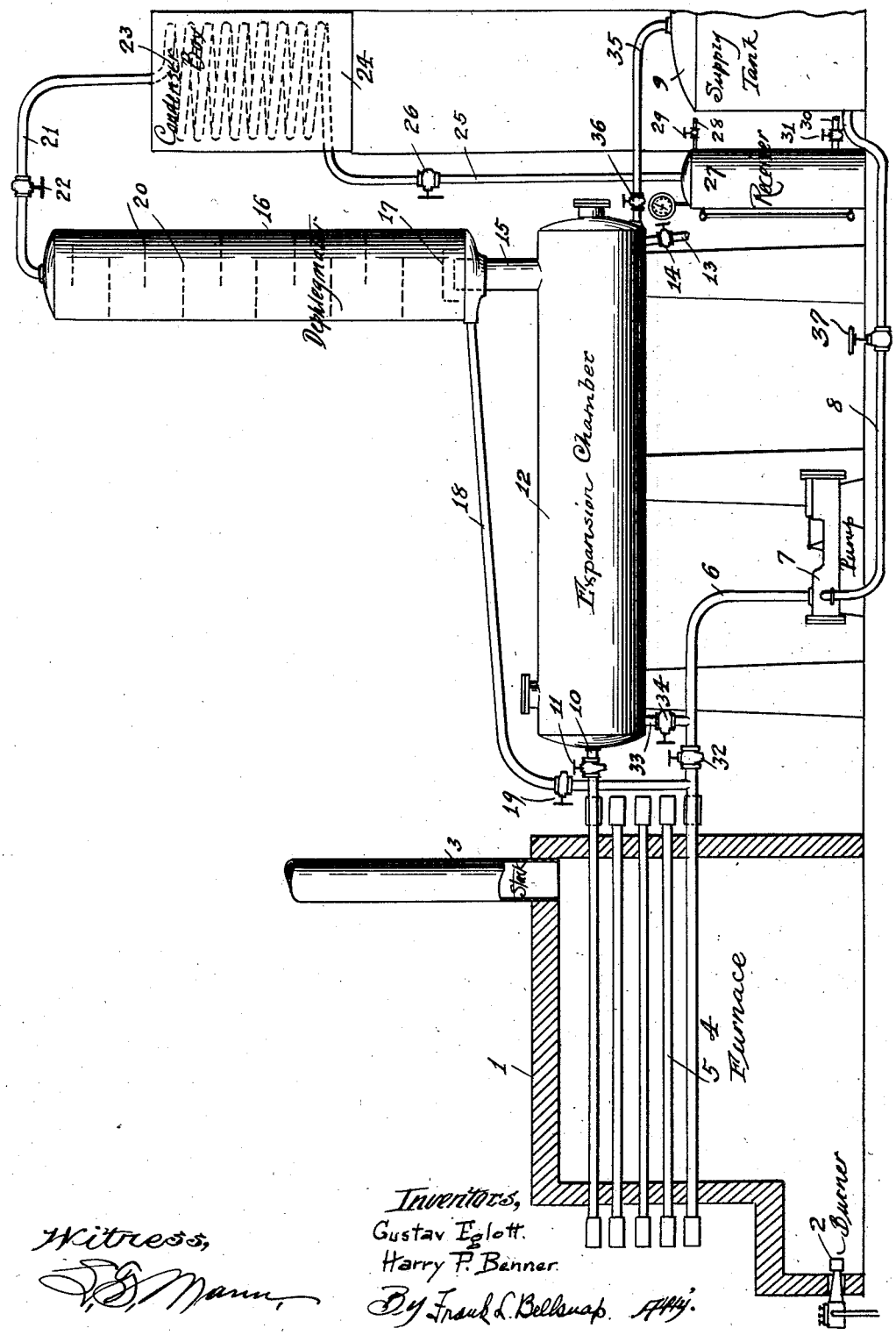

1,805,614

UNITED STATES PATENT OFFICE

GUSTAV EGLOFF AND HARRY P. BENNER, OF CHICAGO, ILLINOIS, ASSIGNORS TO UNIVERSAL OIL PRODUCTS COMPANY, OF CHICAGO, ILLINOIS, A CORPORATION OF SOUTH DAKOTA

APPARATUS FOR CRACKING OIL

Application filed March 28, 1921, Serial No. 456,220. Renewed February 21, 1929.

This invention relates to improvements in apparatus for cracking oil and refers more particularly to that type of apparatus in which the oil is circulated through a closed coil forming a heating chamber, delivered in substantially liquid phase to an expansion chamber where vaporization takes place and carbon is precipitated.

In a process and apparatus of this character, it is necessary to periodically shut the apparatus down and clean out the carbon from the expansion chamber. In order to do this, it is necessary to cool the apparatus. This is generally accomplished by circulating natural cool oil through the system. This takes considerable time.

The object of the present invention is to provide novel means for quickly carrying off the oil and quickly cooling the expansion chamber. The invention will more fully appear from the accompanying drawings, in which the single figure is a view, partly in vertical section, and partly in side elevation, of our improved apparatus.

Referring in detail to the drawing, 1 designates the furnace, having burner 2, stack 3 and combustion space 4. In the furnace is mounted the heating chamber which may take the form of a continuous coil 5, of say, 4" pipe. The inlet side of this coil is connected by the feed line 6 to charging pump 7. The pump in turn is connected to suction line 8, to the supply tank 9. The discharge side of the coil is connected by transfer line 10, having a throttle valve 11, to one end of an elongated expansion chamber 12, located outside of the fire zone. This expansion chamber 12 has residue drawoff pipe 13 controlled by throttle valve 14 and vapor outlet pipe 15, the latter extending into the lower end of a dephlegmator 16 and provided with a spaced cap member 17 to prevent the reflux condensate from falling back into the expansion chamber. Instead, the reflux condensate is returned to the feed line 6 by return line 18 having a throttle valve 19.

The dephlegmator is provided with the alternately disposed baffles 20, vapor outlet pipe 21 having throttle valve 22, leading to the condenser coil 23, seated in condenser box 24. The lower end of the coil is connected by pipe 25 having throttle valve 26 to the top of receiver 27. This receiver 27 has gas outlet pipe 28, controlled by throttle valve 29, and distillate drawoff pipe 30, controlled by throttle valve 31.

Describing now the manner of cooling the expansion chamber, the feed line 6 is provided with the throttle valve 32, whereby it may be shut off from the coil 5. It is also provided with a branch pipe 33 having throttle valve 34, which pipe leads to one end of the expansion chamber 12. At its other end, the oil is drawn back to the supply tank 9 through the pipe 35 controlled by throttle valve 36.

A suction line 8 is also provided with the throttle valve 37. When the plant is running, the valves 34 and 36 are closed and the valve 32 opened. When it is necessary to shut the plant down for cleaning, the valves 11 and 32 are closed as well as the valve 14. The valves 34 and 36 are opened. Cool oil is then circulated continuously through the expansion chamber and rapidly cools down the expansion chamber so it may be cleaned.

The process may be operated at a pressure on the entire system of say, 175 pounds, by suitably regulating the valves on the receiver and the residue drawoff valve on the expansion chamber. The oil is preferably delivered in liquid phase to the expansion chamber and may be heated to a temperature in the transfer line of 830 degrees F., as for example, in treating amid-continent gas oil, of 32 degrees Baumé. The reflux condensate is continuously returned to the system through the line 18. We are not, however, here claiming the manner of normally operating the process but only the means of cooling down the expansion chamber.

We claim as our invention:

An apparatus for treating oil, comprising a heating coil located in a furnace and an expansion chamber located outside of the furnace with which said coil communicates, a dephlegmator connected to said expansion chamber, means for condensing and collecting the vapors issuing from the dephlegmator; a raw oil supply tank, a charging line leading from said tank to said coil, a pump interposed in said charging line, a connection between the expansion chamber and said supply tank, a connection between said charging line and said expansion chamber, valves interposed in said connections permitting the coil to be shunted to provide for a local circulation of the oil from the supply tank through the expansion chamber to cool said expansion chamber.

GUSTAV EGLOFF.
HARRY P. BENNER.